H. L. DOOLEY.
CORN PLANTER.
APPLICATION FILED JAN. 27, 1911.
1,128,766.
Patented Feb. 16, 1915.
2 SHEETS—SHEET 1.
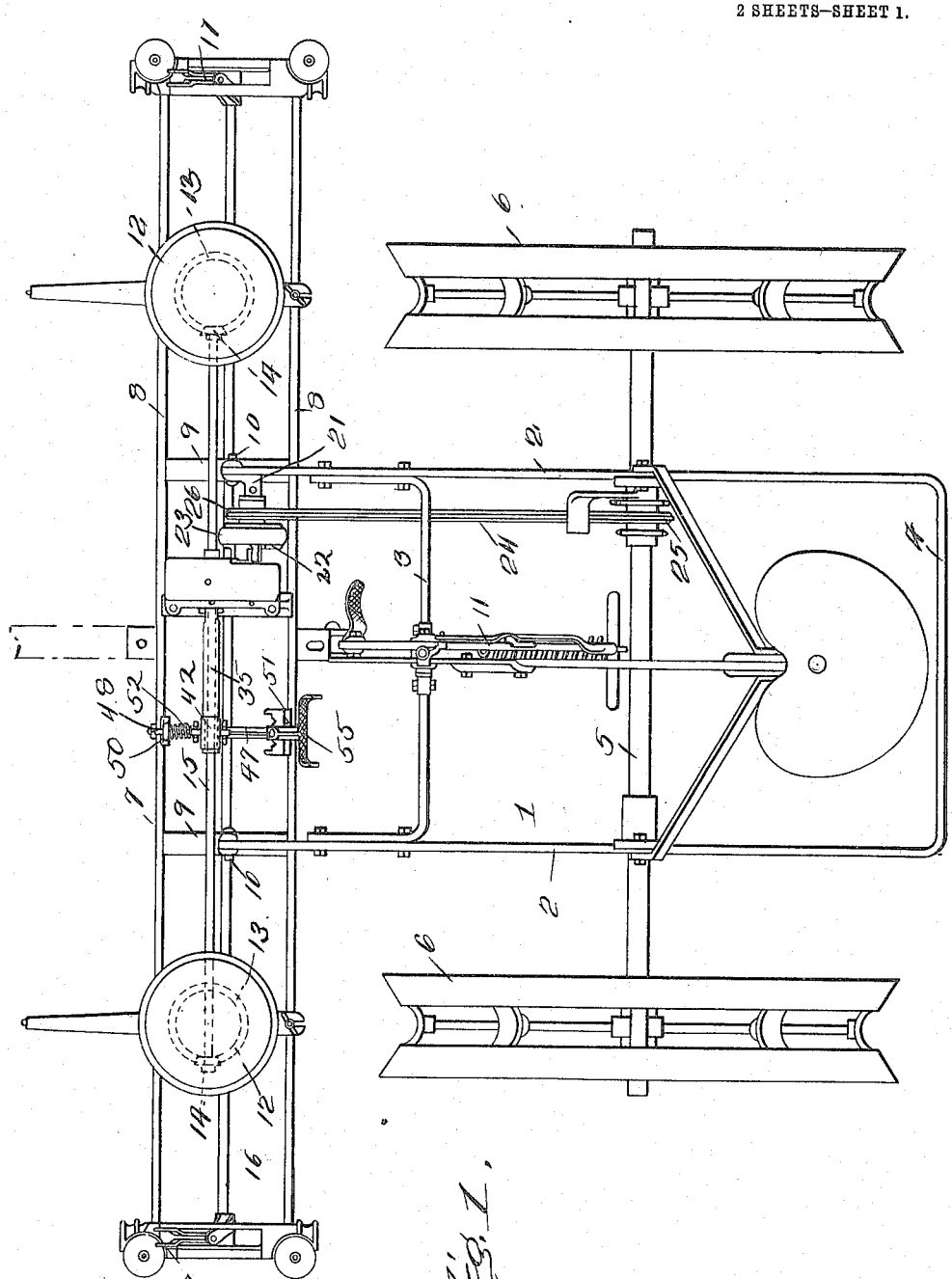
Witnesses
Inventor
Harry L. Dooley
By
Attorney

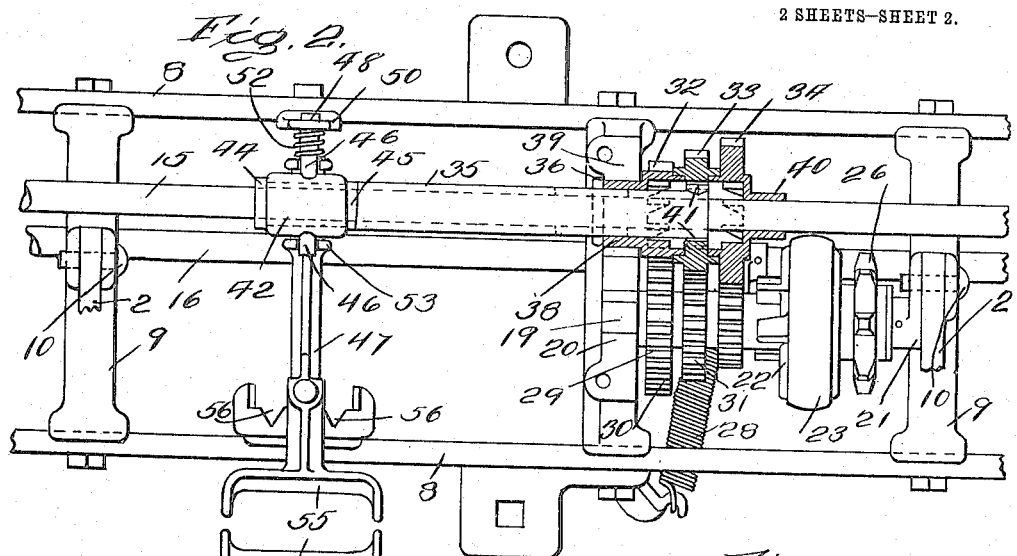
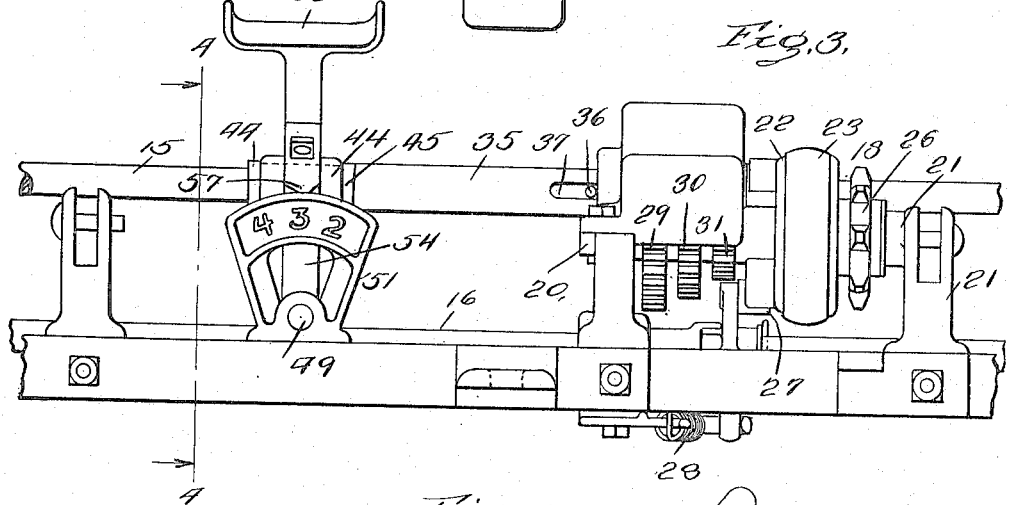

UNITED STATES PATENT OFFICE.

HARRY L. DOOLEY, OF ROCK ISLAND, ILLINOIS, ASSIGNOR TO DEERE & MANSUR CO., A CORPORATION OF ILLINOIS.

CORN-PLANTER.

1,128,766.  Specification of Letters Patent.  Patented Feb. 16, 1915.

Application filed January 27, 1911. Serial No. 605,105.

*To all whom it may concern:*

Be it known that I, HARRY L. DOOLEY, a citizen of the United States, residing at Rock Island, in the county of Rock Island and State of Illinois, have invented certain new and useful Improvements in Corn-Planters, of which the following is a specification, reference being had therein to the accompanying drawings.

This invention relates to improvements in seed planting machines, more particularly those of the type ordinarily used for the planting of corn, and known as check row planters.

The object of my invention is to provide in combination with the planter driving mechanism and the seed separating and depositing devices an improved mechanism for controlling and adjusting the operating gear for the said seed separating and depositing devices.

In the accompanying drawings, which form a part of this specification, I have shown as a whole a planter which may be considered, so far as its general arrangement is concerned, to be of a type well known in the art. I have shown attached to this planter and forming a part thereof, the particular mechanism which constitutes my present invention.

Of the drawings Figure 1 is a plan view of the planter as a whole. Fig. 2 is an enlarged plan view of the gearing and associated elements. A part of the gearing is shown in section. Fig. 3 is an enlarged elevation taken looking forward of the parts shown in Fig. 2. Fig. 4 is a fragmentary cross sectional view taken along the line 4—4 of Fig. 3.

Referring to the drawings, 1 represents as a whole the main frame of the planter. This comprises two side bars 2, 2 and the front and rear cross bars 3 and 4.

5 is the main axle which is rotatable in suitable bearings connected with the cross bars.

6, 6 are the main driving and supporting wheels secured to the axle 5.

7 represents as a whole the forward or transverse frame. This comprises bars 8, 8, and the tie pieces 9, 9. Pivotal connections 10, 10 are provided between the forward ends of the bars 2, 2, and the tie pieces 9, 9. The relative positions of the two frames 1 and 7 are controlled by means of a suitable lever system which is indicated in the drawings by 11.

12, 12 represent the seed separating and depositing devices. These may be of any usual or preferred form, and a detailed description of them will not be necessary. It will be sufficient to point out that they are driven by means of bevel gears 13, 13 and the bevel pinons 14, 14 which are mounted upon the transverse seeder shaft 15. 16 is a rock shaft and carries the check wire forks 17, 17. These forks are adapted to be actuated by the buttons of a check wire to rock the shaft and cause the operation of the seed separating devices by means of the mechanism which will be hereafter described.

The mechanism which I have shown for driving the seeder shaft is similar to that covered by my co-pending application for improvements in variable seed planters, filed May 11, 1910, Serial No. 560,642. For the sake of convenience, however, I will briefly describe this gearing. 18 is a clutch connected with a short jack shaft 19 parallel to the main seeder shaft 15. This shaft is supported in the bearing brackets 20 and 21. The clutch 18 comprises a disk part 22 and a drum part 23 adjacent to it. The disk part 22 is keyed to the shaft 19 and the drum part is rotatably mounted on the shaft and is continuously driven by means of a chain 24 which passes over a sprocket wheel 25 on the main axle and a sprocket wheel 26 secured to the drum part of the clutch. The details of the clutch are not shown in the drawings as these details constitute no part of my present invention. It will be sufficient to say that the clutch comprises a suitable pawl and ratchet mechanism by means of which the disk part 22 can be connected to the drum part 23 in such a way as to be driven thereby. Normally the pawl devices of the clutch are held in inoperative position by an arm 27 on the rocker shaft 16. As has before been stated, the rocker shaft 16 carries at its ends check wire forks 17, 17. When one of the check forks is engaged by a tappet on a check row wire, the fork is swung backward and carries with it the shaft 16 and the arm 27. This movement of the arm 27 serves to release the pawl of the clutch to permit it to operatively connect the disk 22 to the continually rotating drum 23. In this way the clutch acts to drive the shaft 19. This movement of the shaft continues for a half revolution, whereupon the clutch arm 27 having been returned to its normal position by the spring 28, engages the pawl mechanism of the clutch to disengage the two clutch elements. This intermittent actuation of a rotating part by means of a clutch mechanism controlled by the check forks, is well known and is commonly employed in the art. Ordinarily, however, the clutch mechanism is mounted directly upon the seeder shaft. This driving mechanism which I have shown for purposes of illustration, is different from that ordinarily used in that a separate jack shaft is employed, as has been described. The seeder shaft is driven from the jack shaft by means of gearing which is adapted to transmit to the seeder shaft at each actuation of the jack shaft an adjustable amount of angular movement. This gearing comprises three spur gears 29, 30 and 31, which are of different sizes and which are rigidly fixed on the clutch shaft 19, and three spur gears 32, 33 and 34 which are mounted upon the seeder shaft 15 in mesh with the gears 29, 30 and 31, respectively.

In the preferred form of my invention as shown in Fig. 2, a sleeve 35 is provided on the seeder shaft 15. This sleeve is slidable on the shaft but is secured to it to rotate therewith by means of a pin 36 which extends through the shaft and which engages at its ends with longitudinal slots 37 in the sleeve. The gear 32 is provided with a hub in the form of a hollow cylinder 38 which surrounds the sleeve and which has a bearing in the bracket 39. The gear 34 is similarly provided with a laterally extending cylindrical hub 40 which has a bearing upon the shaft 15. The gears 32 and 34 have on their adjacent sides to the hubs annular flanges which serve as bearings for the central gear 33. Each of the gears is provided with central annular openings in which are located teeth, four teeth being provided on each of the gears 32 and 34 and six teeth on the gear 33. One end of the slidable sleeve 35 is adapted to enter the hollow annular spaces within the gears 32, 33 and 34. This end of the sleeve is provided with lugs 41 which are adapted to engage with the teeth of one or another of the gears to connect the said gear with the sleeve and through the sleeve with the shaft. Therefore, by changing the longitudinal position of the sleeve, either of the gears 32, 33 or 34 may be connected with the seeder shaft 15 and the angular movement of the shaft will be varied in accordance with which gear is operatively connected. The sleeve 35 is provided with a two-part collar 42, the parts of which are clamped together to inclose the sleeve by means of the bolt 43. Flanges 44 and 45 engage the collar to hold it against longitudinal movement relative to the sleeve. 46, 46 are horizontally extending pins disposed at diametrically opposite points on the collar 42. 47 is a rock shaft or lever provided at its ends with trunnions 48 and 49 which are pivotally and slidably mounted in brackets 50 and 51. A coil spring 52 surrounds the trunnion 48 and by engagement with the bracket 50 serves to hold the rock shaft or lever 47 normally at the rearward limit of its sliding movement. The rock lever 47 is provided with an upstanding forked arm 53, the forks of which embrace the collar 42 and are provided with vertical slots adapted to receive and engage the oppositely disposed pins 46, 46 on the collar. Sufficient clearance is provided between the forks of the arm 53 and the collar to permit limited sliding movement of the rock lever in its brackets. 54 is another arm on the rock lever 47. This extends upward parallel to the arm 53. This arm 54 carries a foot treadle 55 which may, for the sake of convenience, be a separate piece bolted to the arm. The bracket 51 is provided with an upstanding part which has on its forward edge three V-shaped notches 56, 56. The arm 54 carries a pointed tooth 57 which is adapted to engage with one or another of the notches 56. It will be observed that the rock lever 47 is forced backward under the action of the spring 52 in such a way that the tooth 57 is at all times held in engagement with one of the notches. The complete engagement of the tooth with a notch is facilitated by the beveled surfaces of the tooth and of the notches.

The operation of my improved device will be readily understood. As has been before stated, the seeder shaft 15 can be rotated at each actuation of the jack shaft 19 through any one of three angles depending upon which of the gears 32, 33 and 34 is connected with it. The connections between the seeder shaft 15 and the seed separating and depositing mechanisms are such that when the shaft is rotated through a small angle by the gear 34, a small number of seeds, as for instance two, is dropped by each seed separating mechanism. When the gear 33 is connected with the seeder shaft, it is rotated through a larger angle and a larger number of seeds, as for instance three, is dropped. When the gear 32 is connected with the seeder shaft, it is rotated through a still larger angle and a still larger number of seeds, as for example four, is deposited. The connection of one or another of the gears to the seeder shaft is effected by changing the position of the slidable sleeve 35. This the driver accomplishes by placing his foot upon the treadle 55 and pushing forward sufficiently to move the rock lever 47 against the action of the spring 42 to disengage the tooth 57 from the notch 56 with which it may have been engaged. When the rock lever is thus pushed forward, it can be freely swung laterally about its pivotal axis by means of the foot treadle. As the rock lever is swung, it of course carries with it the sleeve 35. After the sleeve has been moved into position to engage the proper gear, then the driver releases his foot from the treadle 55 and the spring 52 throws the rock lever back, the tooth 57 entering one of the notches 56.

If desired, the bracket 51 may be provided, as shown in Fig. 3, with figures "4," "3" and "2" which indicate the number of seeds deposited at each actuation for each position of the treadle. It will be observed that the spring 52 coöperating with the inclined edges of the notches 56 always serves to move the parts into one or another of their coöperative positions and hold them there. With my improved construction it is impossible for the driver to carelessly leave the gear controlling mechanism in an intermediate position such that two of the gears are engaged at the same time or such that no gear is engaged.

What I claim is:

1. In a corn planter, the combination of a frame, an axle and driving wheels for the frame, two transversely opposite seed separating and depositing mechanisms on the frame, a driver's seat on the frame, a transverse seeder shaft operatively connected to the seed separating and depositing mechanisms, a series of differently speeded gear trains interposed between the axle and the seeder shaft, a transversely slidable device for connecting any one of the said gear trains with the seeder shaft, a transversely movable controlling element for the said transversely slidable element, the said element being within the reach of a driver on the seat and bodily movable independently of the said device forward and backward parallel to the lines of movement of the planter, and means automatically acting to lock the said device against transverse movement when it is in one position of forward and backward adjustment.

2. In a corn planter, the combination of a frame, an axle and driving wheels for the frame, two transversely opposite seed separating and depositing mechanisms on the frame, a driver's seat on the frame, a transverse seeder shaft operatively connected to the seed separating and depositing mechanisms, a series of differently speeded gear trains interposed between the axle and the seeder shaft, a transversely slidable device for connecting any one of the said gear trains with the seeder shaft, a controlling element for the said transversely slidable device within the reach of a driver on the seat, the said element being movable transversely about a fixed longitudinal axis and being also bodily movable independently of the said device forward and backward parallel to the lines of movement of the planter, means positioned to be engaged by the said element at one extreme of its forward and backward movement to lock it against transverse movement, and a spring for normally holding the said element against the locking means.

3. In a corn planter, the combination of a frame, an axle and driving wheels for the frame, two transversely opposite seed separating and depositing mechanisms on the frame, a driver's seat on the frame, a transverse seeder shaft operatively connected to the seed separating and depositing mechanisms, a series of differently speeded gear trains interposed between the axle and the seeder shaft, a transversely slidable device for connecting any one of the said gear trains with the seeder shaft, a transversely movable controlling element for the said transversely slidable device, the said element being also bodily movable independently of the said device forward and backward parallel to the lines of travel of the planter and being provided with a rearward facing foot rest within the reach of the foot of a driver on the seat whereby it can be moved forward and then transversely, a spring for normally holding the element in its rearmost position, and means in position to engage the said element when in the said rearmost position to lock it against transverse movement.

4. In a corn planter, the combination of a frame, an axle and driving wheels for the frame, two transversely opposite seed separating and depositing mechanisms on the frame, a driver's seat on the frame, a transverse seeder shaft operatively connected to the seed separating and depositing mechanisms, a series of differently speeded gear trains interposed between the axle and the seeder shaft, a transversely slidable device for connecting any one of the said gear trains with the seeder shaft, a transversely movable controlling element for the said transversely slidable device, the said element being also bodily movable independently of the said device forward and backward parallel to the lines of travel of the planter and being provided with a rearward facing foot rest within the reach of the foot of a driver on the seat whereby it can be moved forward and then transversely, a spring for normally holding the element in its rearmost position, and a bracket having notches with inclined edges adapted to engage the said element and automatically move it transversely into one or another of its active positions as it is moved backward by the spring.

In testimony whereof I affix my signature, in presence of two witnesses.

HARRY L. DOOLEY.

Witnesses:
 OSCAR F. LUNDAHL,
 ROBERT M. ADAMS.

Copies of this patent may be obtained for five cents each, by addressing the "Commissioner of Patents, Washington, D. C."